(12) United States Patent
Silvert

(10) Patent No.: US 8,005,940 B2
(45) Date of Patent: Aug. 23, 2011

(54) METHOD AND SYSTEM FOR UNIT TESTING WEB FRAMEWORK APPLICATIONS

(75) Inventor: Stanley D. Silvert, McDonough, GA (US)

(73) Assignee: Red Hat, Inc., Raleigh, NC (US)

( * ) Notice: Subject to any disclaimer, the term of this patent is extended or adjusted under 35 U.S.C. 154(b) by 26 days.

(21) Appl. No.: 12/693,276

(22) Filed: Jan. 25, 2010

(65) Prior Publication Data

US 2010/0131802 A1    May 27, 2010

Related U.S. Application Data

(63) Continuation of application No. 11/820,996, filed on Jun. 20, 2007, now Pat. No. 7,680,917.

(51) Int. Cl.
*G06F 15/173*    (2006.01)

(52) U.S. Cl. .......................................... 709/223

(58) Field of Classification Search .................. 709/223
See application file for complete search history.

(56) References Cited

U.S. PATENT DOCUMENTS

| | | | |
|---|---|---|---|
| 5,371,746 A | 12/1994 | Yamashita et al. | |
| 5,572,664 A | 11/1996 | Bujanos | |
| 5,987,248 A | 11/1999 | Murayama et al. | |
| 6,249,907 B1 | 6/2001 | Carter et al. | |
| 6,543,048 B1 | 4/2003 | Kuzemchak et al. | |
| 6,591,378 B1 | 7/2003 | Arends et al. | |
| 6,715,110 B1 | 3/2004 | Beebe et al. | |
| 6,748,397 B2 * | 6/2004 | Choi | 1/1 |
| 7,133,363 B2 * | 11/2006 | Takase et al. | 370/230 |
| 7,293,027 B2 * | 11/2007 | Margolus | 1/1 |
| 7,673,049 B2 * | 3/2010 | Dinello et al. | 709/226 |
| 7,872,973 B2 * | 1/2011 | Sterne et al. | 370/235 |

* cited by examiner

*Primary Examiner* — David Y Eng
(74) *Attorney, Agent, or Firm* — Lowenstein Sandler PC

(57) ABSTRACT

The lifetime of a data structure containing information for processing a client request is manipulated so that the information remains available to a review and/or testing process. After examination, the information may be discarded.

11 Claims, 7 Drawing Sheets

METHOD AND SYSTEM FOR UNIT TESTING WEB FRAMEWORK APPLICATIONS

RELATED APPLICATION

This application is a continuation of U.S. patent application Ser. No. 11/820,996, filed on Jun. 20, 2007, now U.S. Pat. No. 7,680,917 issued on Mar. 16, 2010 the entirety of which is incorporated herein by reference.

FIELD

The invention relates to web application unit testing. More specifically, the invention relates to testing frameworks that permit examination of transient request contexts.

BACKGROUND

The Hypertext Transfer Protocol ("HTTP"), defined in the Internet Engineering Task Force's Request For Comments number 2616, published June 1999 ("IETF RFC 2616") describes a simple, generic, stateless application-level protocol that supports a large proportion of the diverse services available on the World-Wide Web. The services available, and application deployment frameworks to support the services, have become increasingly sophisticated, and correspondingly difficult to test and debug. While early services were simple enough to test manually (e.g., by loading a Uniform Resource Locator or "URL" and confirming that the correct document was presented), contemporary web applications often involve extended request-response sequences threaded together with complicated logic, so it is infeasible to test every possible scenario manually.

Automatic testing has taken up much of the load: a testing program is configured to emulate a web browser and issue a sequence of requests, checking the response to each request to ensure that it contains expected information. This approach can detect application failures that would be visible to an end user, but cannot distinguish server-side states that lead to the same user result. For example, a web application may request a username and password before performing a task. If either the username or password is incorrect, a "Please Re-try" message may be presented. An automatic tester may be configured to send incorrect data for either the username or the password (or both), but cannot determine whether the error message is a result of the incorrect data transmitted, or of incorrect data handling at the server.

Another approach to testing web applications is to construct a synthetic environment within which the application is executed. A replica request is submitted, and the application's internal state can be monitored as it executes. This approach permits good visibility into the application's logic, but as execution environments become more complex, it becomes difficult to replicate them correctly, and synthetic environment anomalies (rather than actual web application bugs) may cause unexpected behavior.

Automatic test methods that permit the examination of web application execution within a true (not emulated) environment may improve software quality and reduce development time.

BRIEF DESCRIPTION OF THE DRAWINGS

Embodiments of the invention are illustrated by way of example and not by way of limitation in the figures of the accompanying drawings, in which like references indicate similar elements. It should be noted that references to "an" or "one" embodiment in this disclosure are not necessarily to the same embodiment, and such references mean "at least one."

DETAILED DESCRIPTION

Embodiments of the invention work in conjunction with client/server applications where at least some data is transient (i.e., it is discarded after processing one request, and generated anew if it is needed to process a subsequent request). For efficiency, an application may discard transient data as soon as it is no longer needed to prepare a response to a client's request, but unavailability of this data may hamper debugging and testing of the application. An embodiment of the invention extends the "lifetime" of transient data so that it can be examined to confirm correct application operation or to find clues about application bugs.

Figure 1:
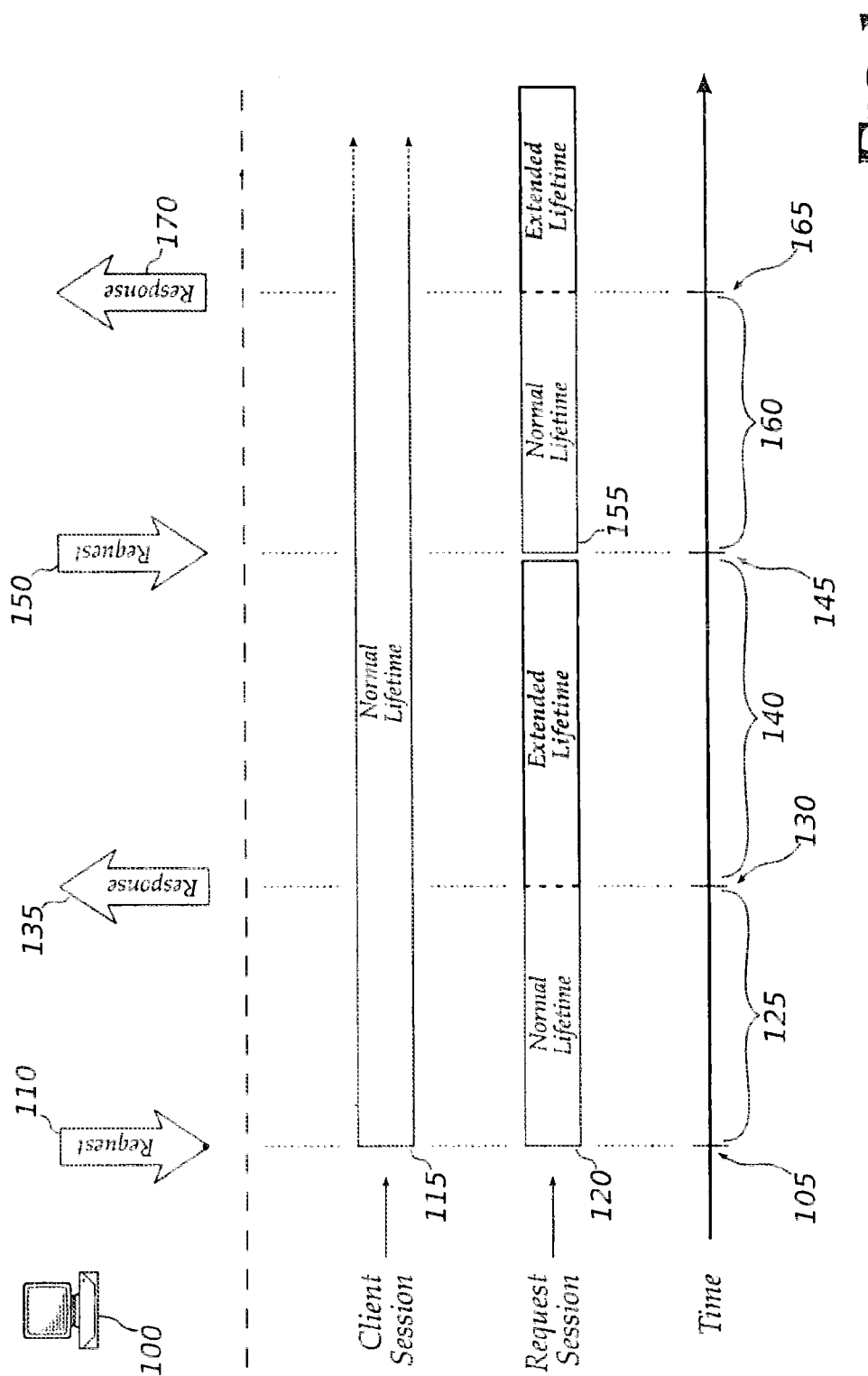
FIG. 1 shows a timeline of events that occur when a client issues a series of requests through a stateless application-level protocol.

FIG. 1 is a timeline depicting events of relevance to operations of some embodiments of the invention. The events occur as a client 100 issues a series of requests to a server. At time 105, a first request 110 is issued to the server. In this example, the request is the very first interaction between the client and the server, so a new client session object 115 is created. Client session object 115 is a persistent data structure that stores information that the application may need to reference as it interacts with the client.

A second data structure, request session object 120, is also created when request 110 is received. The request session object 120 contains data that the server uses in responding to request 115. Response preparation occurs during time period 125, and the request session's normal lifetime terminates at time 130, when response 135 is returned to client 100. Embodiments of the invention arrange for request session object 120 to be available during time period 140, after response 135 is delivered to client 100.

Client 100 issues a second request 150 at time 145, which leads to the creation of a new request session object 155. At around this time, the previous request session object 120 is decommissioned, discarded and/or destroyed. The new request session object 155 is used during time period 160 to prepare response 170. An embodiment of the invention may extend the lifetime of request session object 155 past time 165, when response 170 is returned, and when request session object 155 would normally be discarded.

Embodiments of the invention permit access to the request session object—a transient, request-specific data structure containing information relevant to the processing of one request—after the object has served its purpose and would ordinarily be discarded. A tester or debugger may refer to the information in the object to confirm that the server is operating as expected, or to help determine why it is not operating as expected.

Figure 2:
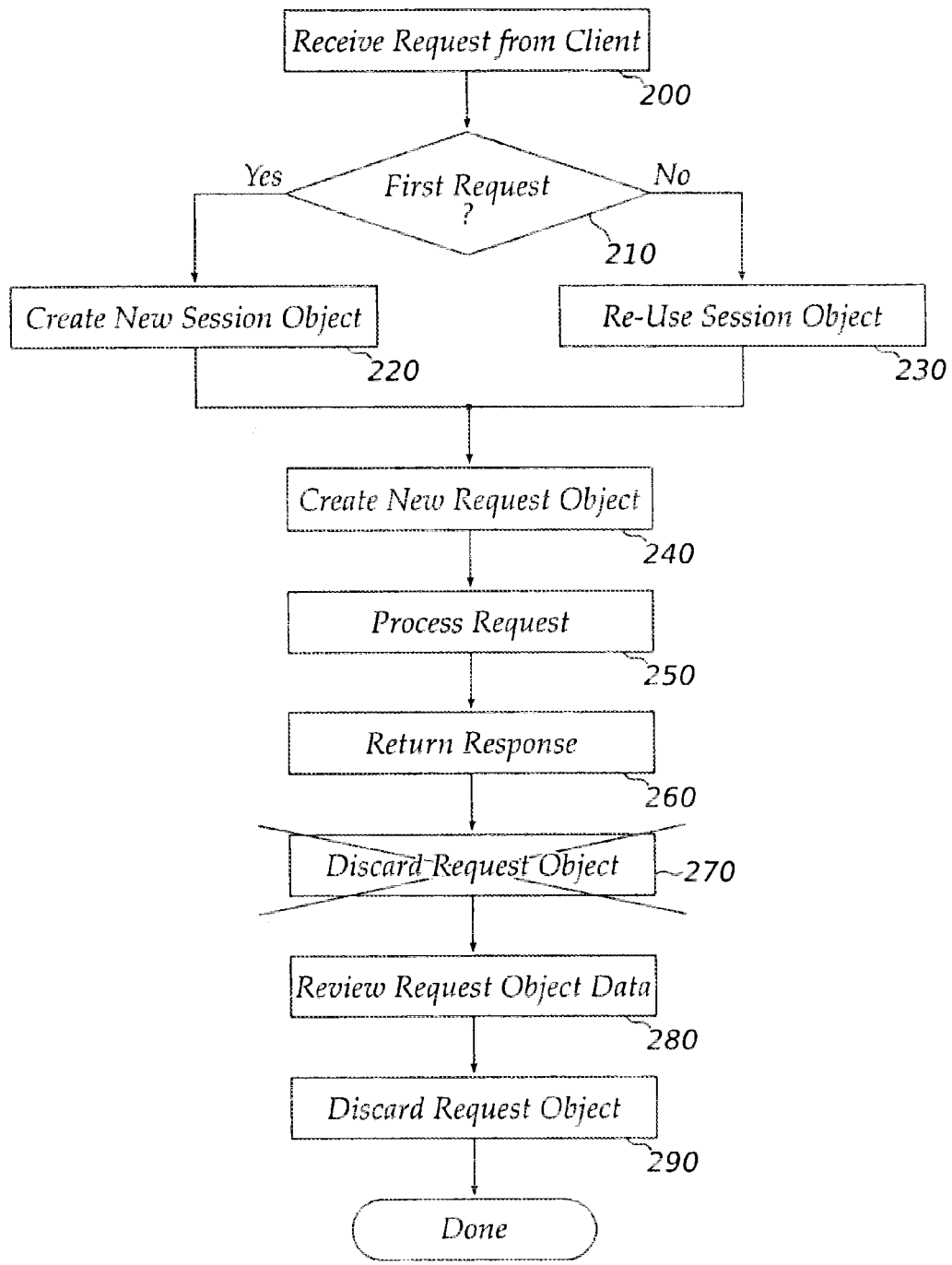
FIG. 2 is a flow chart outlining operations according to an embodiment of the invention.

FIG. 2 is a flow chart of operations of an embodiment of the invention. These operations begin when a request is received from a client (200). If the request is the very first request from that client (210), a new session object is created (220). Otherwise, a previously-created session object is located and re-used (230). (The determination whether this is the "very first request" depends on whether the client is associated with an existing session data structure. Such data structures are often purged after a predetermined period of inactivity, so—for example—a request might be considered "the first" if it has been more than a few hours or days since a previous request, and the client's old session data structure has been discarded.)

Now, a new request object is created (240). The request object is a transient data structure used to hold information relevant to the processing of the current request. However, there is no need to store the information until a subsequent request, so the request object may be discarded after a response to the request is produced.

The client's request is processed (250), using information in the session object and request object. An appropriate response is returned to the client (260). The system may discard the request object (270), but an embodiment of the invention prevents this from happening (as shown by the "x" in FIG. 2, element 270). One way to prevent the request object from being discarded is to conceal a message that is to cause the data to be discarded from the request object. The details of this concealment are described below.

Data in the request object may be reviewed by a tester or debugger (280) to assist in verifying or analyzing the application's operation. Finally, the request object is discarded (290).

Figure 3:
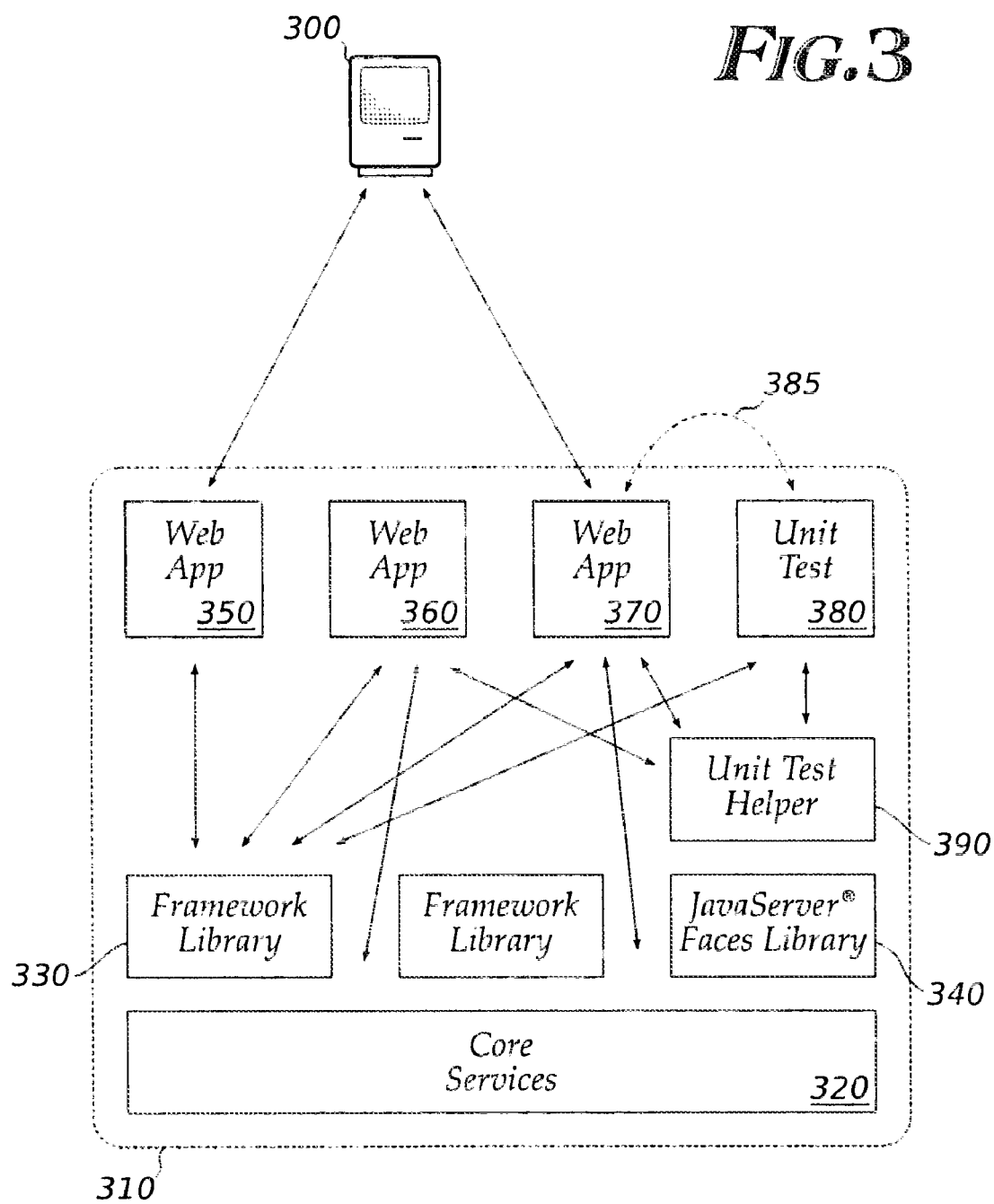
FIG. 3 shows relationships between software modules in an application server that implements an embodiment of the invention.

FIG. 3 outlines some logical units or modules that may be present in a system that incorporates an embodiment of the invention. Overall, the system comprises a server 310 that receives requests from a client 300 and returns responses to the requests. Internally, the server 310 (often called a "servlet container") may include a core services module 320 that provides basic functions that other modules rely upon. A number of framework libraries 330 may provide more specialized services that are nevertheless useful to several different higher-level modules. One embodiment of the invention can be used with a JavaServer® Faces ("JSF") library 340, discussed in greater detail below. (JavaServer is a registered trademark of Sun Microsystems, Inc. of Santa Clara, Calif.) At the highest logical level, web applications 350-370 implement logical sequences according to clients' requests and persistent session data. Web applications, framework libraries, and core services of the servlet container 310 can be tested by a unit test module 380. Unit test module 380 may issue requests (e.g., 385) to web applications 350-370 that reside within the servlet container 310. Since unit test module 380 also operates within servlet container 310, it may have access to internal web application, framework, and core service state information, which permits faster, more comprehensive, and/or more accurate testing and debugging. A unit test helper module 390 may be interposed between a framework library and one or more web applications 360, 380, to accomplish operations according to an embodiment of the invention.

Figure 4:
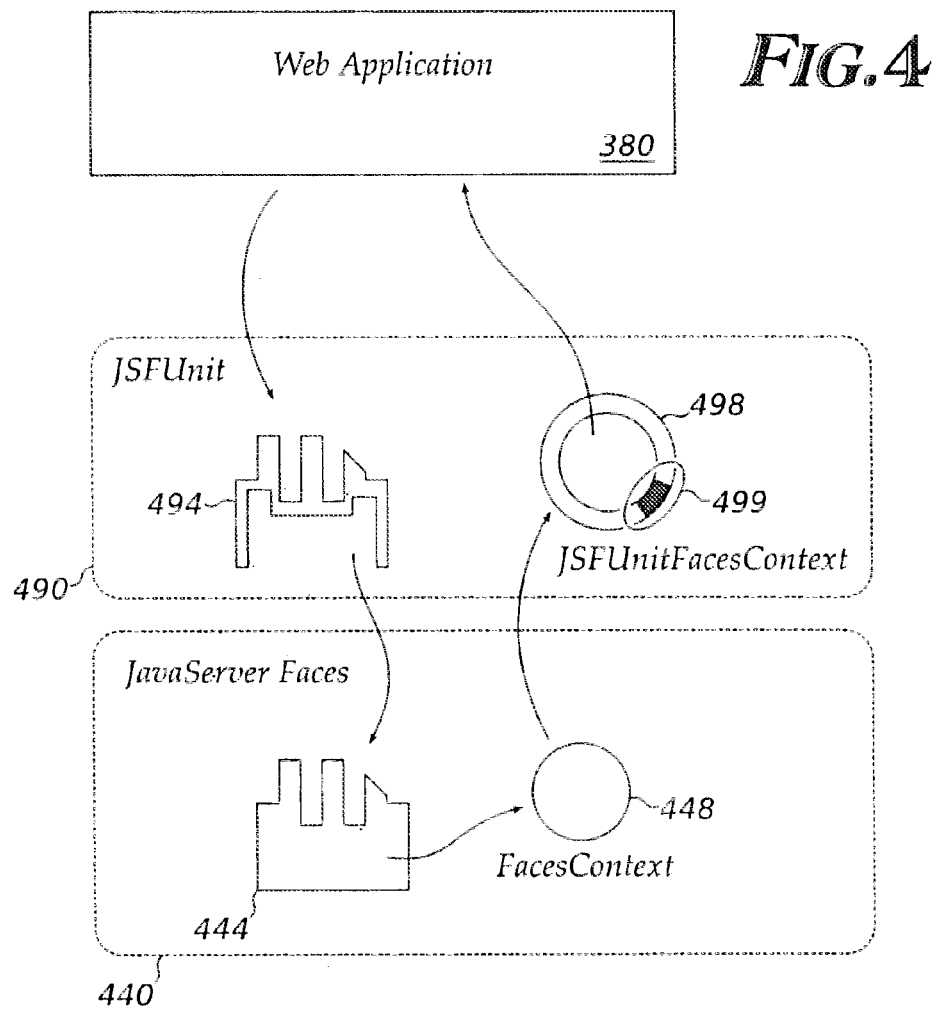
FIG. 4 illustrates an approach to extending data object lifetimes according to an embodiment of the invention.

FIG. 4 shows the relationship between unit test helper module 390 and an underlying framework library 340 in greater detail. In this example, a web application 380 relies on services provided by a JavaServer Faces ("JSF") framework 440. JSF facilitates the management of many user interface ("UI") aspects of a web application. Its operations are mainly limited to the interpretation of a client's request and the preparation of a corresponding response, and an important data structure that contains or leads to information that can help understand the framework's internal operations is transient within the meaning of that term for embodiments of the invention: it is created when a client request arrives, and is discarded when the request has been serviced. This important data structure, used by JSF in its operations, is called a FacesContext 448, has a lifetime like the Request Session objects 120 and 155 shown in FIG. 1.

For debugging and testing web applications that use JSF, access to the FacesContext object after a request/response cycle is completed is very useful. To provide access to this transient data structure, a unit test helper module 490 may be placed between web application 380 and JSF module 440. Within JSF module 440, a component 444 called a FacesContextFactory creates FacesContext objects 448 for use in processing client requests. Unit test helper module 490 provides a "shell" factory 494 that receives requests for a new FacesContext object from web application 380 and propagates those requests to the true FacesContextFactory 444. The returned FacesContext object 448 is "wrapped" within a delegator context 498 by the shell factory 494, and the wrapped object is returned to web application 380 for use in processing a client request. In the JSF environment, wrapped object 498 delegates most functions to the underlying FacesContext object 448, but at least one function is not delegated. (A non-delegated function is indicated by the black-filled annular arc at 499.) When the web application calls a function that is not delegated to the underlying FacesContext object, the function call is effectively concealed or hidden from the underlying object. Therefore, the underlying object does not change its state or perform any functions as it normally would if the function was invoked. (The wrapper object may perform some other function itself, invoke a different function of the wrapped object, or make some change to the state of the wrapped object when the non-delegated function is called. Alternatively, the wrapper object may simply ignore the non-delegated function call.)

Figure 5:
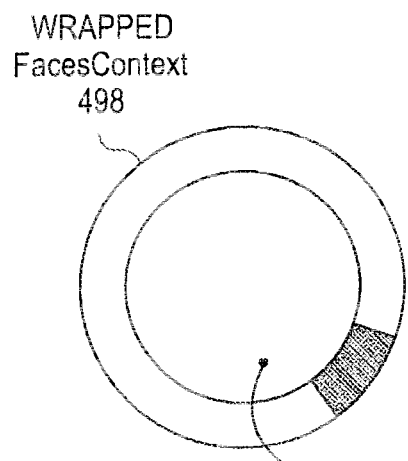
FIG. 5 shows how one data object can lead to a hierarchy of related information.
Figure 5:
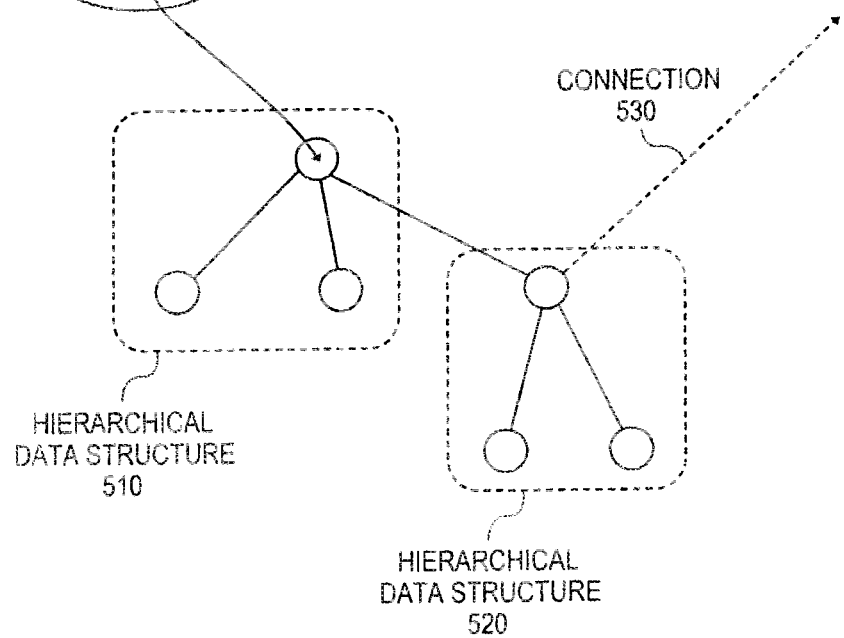

FIG. 5 makes explicit a detail that should be understood by those of ordinary skill in the relevant arts: a data structure such as the wrapped FacesContext object 498 need not contain within itself all of the data that is relevant to the purposes the object serves. Instead, data structures often contain references or pointers to other relevant data (e.g., hierarchical data structures 510 and 520). The valid lifetimes of such referenced data are often keyed to the lifetime of the referring object. Thus, by extending the lifetime of the wrapped FacesContext object 498, and embodiment can ensure that one or more hierarchies of related data 510, 520 are also preserved for review and analysis. Some of the data accessible through the wrapped FacesContext object 498 (e.g. sub-hierarchy 520) may be referred to from other objects as well (this is indicated by connection 530), so its lifetime may not be governed by the lifetime of wrapped FacesContext 498. However, data 520 may be difficult or impossible to locate and correlate with related data 510 if the information in wrapped FacesContext 498 is not available. The end result is the same: wrapped FacesContext object 498 provides an entry point to examine data associated with the JavaServer Faces framework's operations in support of the web application's response to a client.

Figure 6:
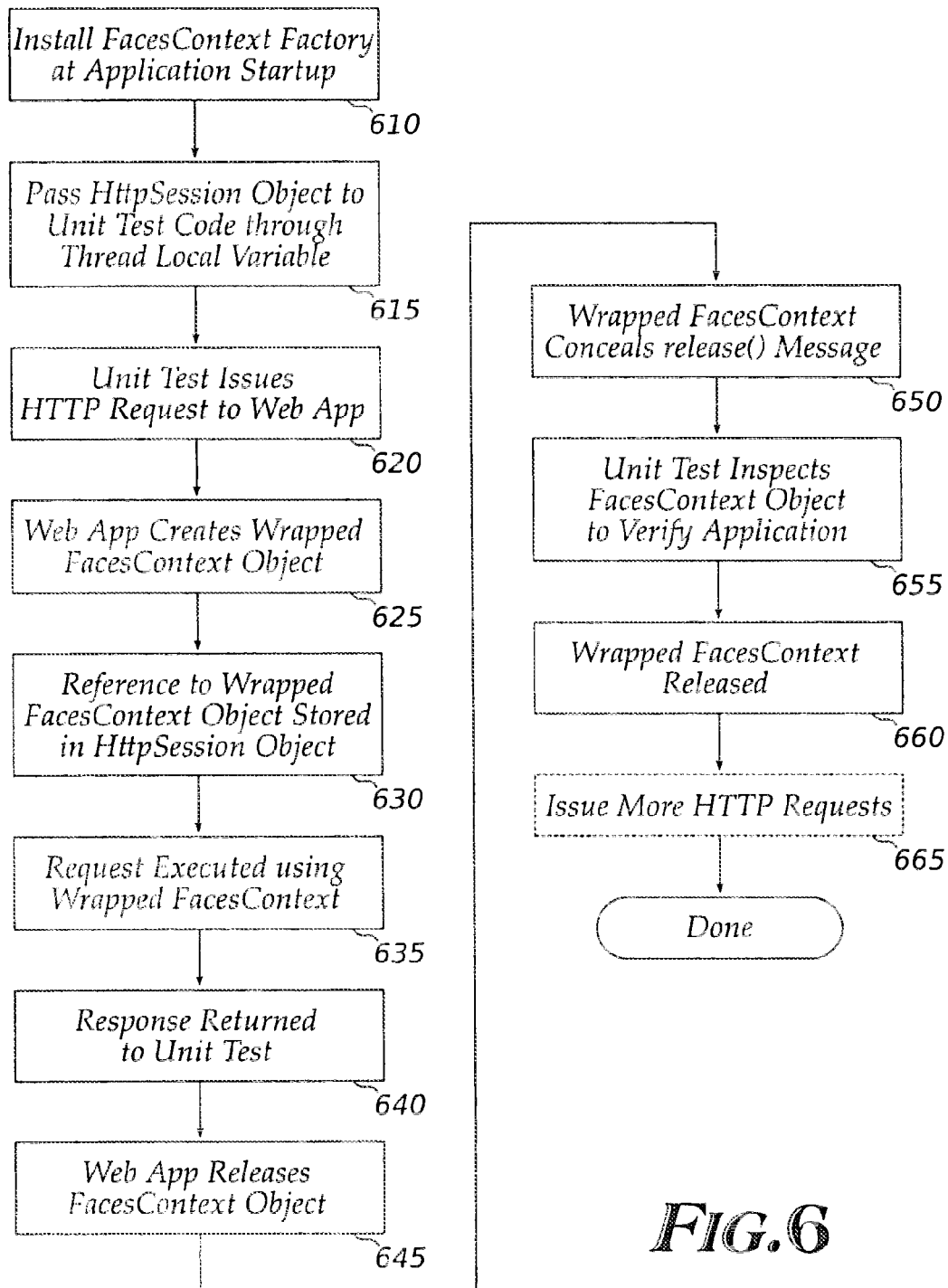
FIG. 6 is a flow chart of a particular embodiment of the invention.

FIG. 6 is a flow chart that outlines operations of an embodiment of the invention, within the specific environment of a Java™ application server such as the Apache Tomcat servlet container, where a web application relies in part on UI services from a JavaServer Faces framework.

At application startup, a FacesContextFactory is installed (610). This is like the shell factory shown at 494 in FIG. 4. An HttpSession object is passed to unit test code through a thread local variable (615). In the example under consideration here, the HttpSession object is like client session object 115, discussed in connection with FIG. 1. It contains (or refers to) data that will be used by the web application to process a series of requests from the client. The unit test code issues a Hypertext Transfer Protocol ("HTTP") request (620), and the web application begins processing the request.

The web application creates a FacesContext object (625), using the FacesContextFactory installed in operation 610. As shown FIG. 4, the FacesContextFactory creates a wrapped FacesContext object that delegates some, but not all, functions to the underlying FacesContext object. A reference to the wrapped FacesContext object is stored in the HttpSession object (630), where it can be examined by the unit test code.

The web application executes the request using information in the wrapped FacesContext object, the HttpSession object, and other information available from the servlet container (635). After processing, a response is returned to the unit test code (640). The web application releases the wrapped FacesContext object (645) (e.g., using a release message). However, the FacesContext wrapper object conceals this release message (650) from the wrapped object—in some embodiments, the release message is one of the messages that is not delegated to the underlying FacesContext object. Therefore, the JavaServer Faces data stored in the transient data structure (or referenced therefrom) remains available to the unit test code. (Normally, after a release message, the data would be discarded or invalidated, and any subsequent attempt to examine it would fail. Concealing the message preserves the information in the FacesContext object, extending its lifetime as described with reference to FIG. 1.) The unit test code inspects the JSF data in the wrapped FacesContext object to verify the application's operation (655). After inspection, the wrapped FacesContext object is released (660), and the unit test code may issue further HTTP requests (665) to test other aspects of the web application.

Figure 7:
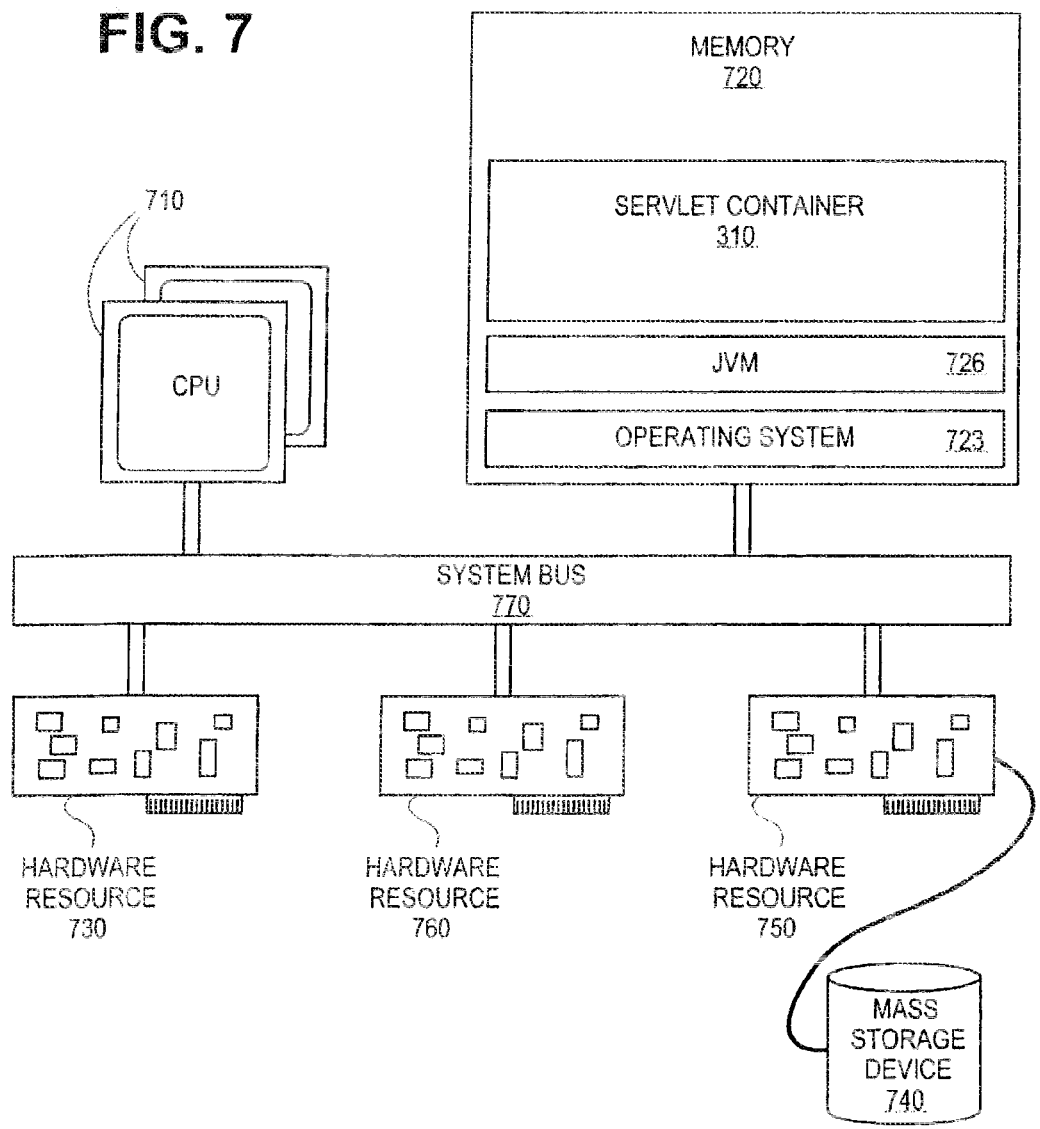
FIG. 7 shows some components and subsystems of a computer system that incorporates an embodiment of the invention.

FIG. 7 shows some components and subsystems of a computer system that incorporates an embodiment of the invention. The system includes a plurality of programmable processors ("central processing units" or "CPUs" 710), which execute instructions contained in memory 720 to perform operations according to embodiments of the invention. Memory 720 may store data and instructions for several different software entities: an operating system ("OS") 723 provides basic hardware resource management and scheduling, while a Java Virtual Machine ("JVM") 726 interprets programs expressed as Java bytecodes. A servlet container 310 (which may have internal structure similar to that shown in FIG. 3) is one possible Java bytecode program. Servlet containers may instead be programs composed of data and instructions that can be directly executed by CPUs 710, or CPUs 710 may be able to execute Java bytecodes directly, without aid of a JVM 726.

The computer system may include hardware resources, such as a network interface 730 to facilitate communications with clients via a distributed data network (not shown) such as the Internet, a mass storage interface 750 to permit data to be stored on and retrieved from a mass storage device 740 such as a hard disk. Some systems may include other hardware resources, such as a video display adapter 760. Memory 720, CPUs 710, and hardware resources 730, 750 and 760, exchange data and commands via a system bus 770.

An embodiment of the invention may be a machine-readable medium having stored thereon data and instructions to cause a programmable processor to perform operations as described above. In other embodiments, the operations might be performed by specific hardware components that contain hardwired logic. Those operations might alternatively be performed by any combination of programmed computer components and custom hardware components.

Instructions for a programmable processor may be stored in a form that is directly executable by the processor ("object" or "executable" form), or the instructions may be stored in a human-readable text form called "source code" that can be automatically processed by a development tool commonly known as a "compiler" to produce executable code. Instructions may also be specified as a difference or "delta" from a predetermined version of a basic source code. The delta (also called a "patch") can be used to prepare instructions to implement an embodiment of the invention, starting with a commonly-available source code package that does not contain an embodiment.

In the preceding description, numerous details were set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions were presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the preceding discussion, it is appreciated that throughout the description, discussions utilizing terms such as "processing" or "computing" or "calculating" or "determining" or "displaying" or the like, refer to the action and processes of a computer system or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, compact disc read-only memory ("CD-ROM"), and magnetic-optical disks, read-only memories (ROMs), random access memories (RAMs), eraseable, programmable read-only memories ("EPROMs"), electrically-eraseable read-only memories ("EEPROMs"), magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes a machine readable storage medium (e.g., read only memory ("ROM"), random access memory ("RAM"), magnetic disk storage media, optical storage media, flash memory devices, etc.), a machine readable transmission medium (electrical, optical, acoustical or other form of propagated signals (e.g., carrier waves, infrared signals, digital signals, etc.)), etc.

The applications of the present invention have been described largely by reference to specific examples and in terms of particular allocations of functionality to certain hardware and/or software components. However, those of skill in the art will recognize that unit testing of software systems that use transient, request-specific data structures can also be implemented by software and hardware that distribute the functions of embodiments of this invention differently than herein described. Such variations and implementations are understood to be captured according to the following claims.

What is claimed:

1. A method comprising:
    concealing from a request session object of a web application a message to discard data from the request session object, the concealing performed by a server running the web application in order to prevent the data of the request session object from being discarded, wherein the request session object is a transient, request-specific data structure containing information relevant to processing a specific request to the web application;
    retrieving, by a tester in the server, the data from the request session object after the message is concealed; and
    reviewing the retrieved data, by the tester, for use in analyzing operations of the web application.

2. The method of claim 1, further comprising:
    creating the request session object to support servicing a first client request of a series of client requests, wherein the concealing occurs after servicing the first client request by the application.

3. The method of claim 2, further comprising:
    receiving a second request from the client after the concealing operation; and
    releasing resources associated with the request session object.

4. The method of claim 3 further comprising:
    creating a second request session object to support servicing the second request from the client; and
    concealing from the second request session object another message to discard data from the second request session object, the concealing to prevent data of the second request session object from being discarded.

5. The method of claim 1 wherein the request session object is a JavaServer Faces FacesContext object.

6. A computer-readable medium containing data and instructions to cause a programmable processor to perform operations comprising:
    creating, by a server running a web application, a persistent client data structure for the web application to store information about a plurality of requests from a client of the web application;
    creating, by the server, a transient request data structure for the server to store information specific to a request of the plurality of requests from the client;
    preparing, by the server, a response to the request using information in the transient request data structure;
    transmitting, by the server, the response to the client;
    extending, by the server, a lifetime of the transient request data structure by concealing from the transient request data structure a message to discard data from the transient request data structure, the concealing performed by the server in order to prevent the data of the transient request data structure from being discarded; and
    inspecting, by a unit test module of the server, the data of the transient request data structure after the preparing, transmitting, and extending operations.

7. The computer-readable medium of claim 6, containing additional data and instructions to cause the programmable processor to perform operations comprising: storing a reference to the transient request data structure in the persistent client data structure.

8. The computer readable medium of claim 6, containing additional data and instructions to cause the programmable processor to perform operations comprising:
    supplying the persistent client data structure to the unit test module through a thread-local variable.

9. The computer-readable medium of claim 6, containing additional data and instructions to cause the programmable processor to perform operations comprising:
    discarding the transient request data structure before a second request of the plurality of requests from the client; and
    creating a second transient request data structure to store information for preparing a response to the second request.

10. The computer-readable medium of claim 6 wherein the persistent client data structure is a type of HttpSession object.

11. The computer-readable medium of claim 6 wherein the transient request data structure extends a FacesContext object.

* * * * *